United States Patent [19]

Schobbe et al.

[11] 4,362,294

[45] Dec. 7, 1982

[54] SPRING SEAT FOR A COIL SPRING

[75] Inventors: Hermann Schobbe, Fellbach; Wolfhard König, Stuttgart; Werner Möhrmann, Fellbach, all of Fed. Rep. of Germany

[73] Assignee: Daimler-Benz Aktiengesellschaft, Stuttgart, Fed. Rep. of Germany

[21] Appl. No.: 189,705

[22] Filed: Sep. 22, 1980

[30] Foreign Application Priority Data

Sep. 20, 1979 [DE] Fed. Rep. of Germany ....... 2938101

[51] Int. Cl.³ .............................................. F16F 1/12
[52] U.S. Cl. ...................................... 267/170; 267/60
[58] Field of Search ............... 267/4, 20 A, 60, 61 R, 267/62, 166, 174, 177, 170, 178, 179, 182, 20 R

[56] References Cited

U.S. PATENT DOCUMENTS

| | | | |
|---|---|---|---|
| 2,527,524 | 10/1950 | Brent | 267/60 |
| 3,653,475 | 4/1972 | Thelander | 267/174 |
| 3,797,852 | 3/1974 | Patterson et al. | 267/61 R |
| 3,892,397 | 7/1975 | Nicholls | 267/61 R |

FOREIGN PATENT DOCUMENTS 2805223 8/1978 Fed. Rep. of Germany .

Primary Examiner—Trygve M. Blix
Assistant Examiner—R. R. Diefendorf
Attorney, Agent, or Firm—Paul M. Craig, Jr.

[57] ABSTRACT

A spring seat with a supporting groove for the freely terminating end of a spring wire of a coil spring for an axle suspension of a motor vehicle. The supporting groove extends merely over a circumferential angular range of about 75° to 120°. The supporting groove is fashioned to be approximately V-shaped in cross section and the terminating end of the spring wire of the coil spring only contacts the flanks of the V-shaped supporting groove.

5 Claims, 3 Drawing Figures

SPRING SEAT FOR A COIL SPRING

The present invention relates to a spring seat and, more particularly, to a spring seat or spring plate for a coil spring provided with a supporting groove for accommodating a freely terminating end of a spring wire of a coil spring, especially a coil spring for an axle suspension of a motor vehicle.

In frequently employed spring seats or plates for coil springs of suspension systems of motor vehicle axles, approximately three quarter of the final winding of the coil spring is constantly in contact with the spring seat. A centering of the coil spring is normally effected on the inside or the outside of the final winding or by means of an indentation. However, in all instances, a clearance must be provided between the wire of the coil spring and the centering surfaces in order to compensate for normal manufacturing tolerances. Additionally, it is especially disadvantageous in that the final winding of the coil spring only plays a small part in the springing action of the spring.

To overcome the above-noted deficiencies, coil springs have been proposed which utilize a roll-type end winding which is not in constant contact with the spring seat or spring plate but rather rolls therealong during operation of the suspension arrangement and also participates in the springing process. Since the rolling along portion of the end winding rubs against the centering surface due to its motions, attempts have been made to overcome this problem by means of the utilization of expensive rubber washers.

The aim underlying the present invention essentially resides in providing a spring seat or spring plate which enables a centering of the coil spring in such a manner that noises which may arise during springing motions of the coil spring are avoided without the use of expensive rubber washers.

In Offenlungsschrift No. 2,805,223, an annular spring seat, machined from a solid piece, is proposed wherein a terminating end of the wire of the coil spring is threaded into a peripheral groove and cemented therein. A flat ramp is arranged following the peripheral groove with a slope of the ramp being larger than that of the spring wire of the coil spring in the corresponding condition so that a firm bilateral clamping of the spring wire end with an adjoining spring wire support under a pretensioning is attained.

While the proposed annular spring seat avoids a clamping hysteresis and ensures a definite number of windings in any springing condition, a disadvantage of this proposed construction resides in the fact that it is extremely expensive to manufacture. Thus, such a proposed annular spring seat is generally applied to the construction of instruments in the measuring technology since the increased expense for the construction of the spring seat is justified in such cases.

While the aforementioned annular spring seat may solve some of the problems to which the present invention is directed, the use of such spring seat in an automotive vehicle would not be feasible because such spring seat is too complicated and too heavy due to its different purpose.

In accordance with advantageous features of the present invention, a spring seat or spring plate is provided which includes a supporting groove for accommodating a freely terminating end of the spring wire of the coil spring of an axle suspension arrangement of a motor vehicle with the supporting groove, extending merely over a circumferential angular range of about 75°–120°, being fashioned to be approximately V-shaped in cross section and with the terminating end of the spring wire of the coil spring contacting only flanks of the V-shaped supported groove. Advantageously, the supporting groove may extend over a circumferential angular range of about 90°.

By virtue of the features of the present invention, it is possible to give the short non-rolling portion of the terminal winding of the coil spring a clear and play-free fixation without imparting any guiding function to the rolling part of the coil spring.

In accordance with further advantageous features of the present invention, the supporting groove may be continued as a channel having such dimensions that the spring wire of the coil spring, if under a load, merely rests therein.

If the spring seat or spring plate of the present invention is to be utilized for coil springs having varying wire thicknesses, and if differently high positions of the spring wire result in the supporting groove, it is also possible to provide in the spring seat between the supporting groove and the channel a zone wherein the spring wire of the coil spring, if under a load, is not in contact with the spring seat or spring wire in order to attain a transistion which is low in bending stresses.

Accordingly, it is an object of the present invention to provide a spring seat with a supporting groove for a coil spring for an axle suspension of a motor vehicle which avoids, by simple means, shortcomings and disadvantages encountered in the prior art.

Another object of the present invention resides in providing a spring seat with a supporting groove for a coil spring for an axle suspension of a motor vehicle which ensures a centering of the coil spring in such a way so as to minimize if not avoid the occurrence of noises during spring motions of the coil spring.

Yet another object of the present invention resides in providing a spring seat with a supporting groove for coil springs for an axis suspension of a motor vehicle which ensures a clear and play-free fixation of the terminal end of the coil spring thereto.

A further object of the present invention resides in providing a spring seat with a supporting groove for coil springs of an axle suspension for a motor vehicle which is simple in construction and therefore relatively inexpensive to manufacture.

These and other objects, features, and advantages of the present invention will become more apparent from the following description when taken in connection with the accompanying drawing which shows, for the purposes of illustration only, one embodiment in accordance with the present invention, and wherein.

Figure 1:
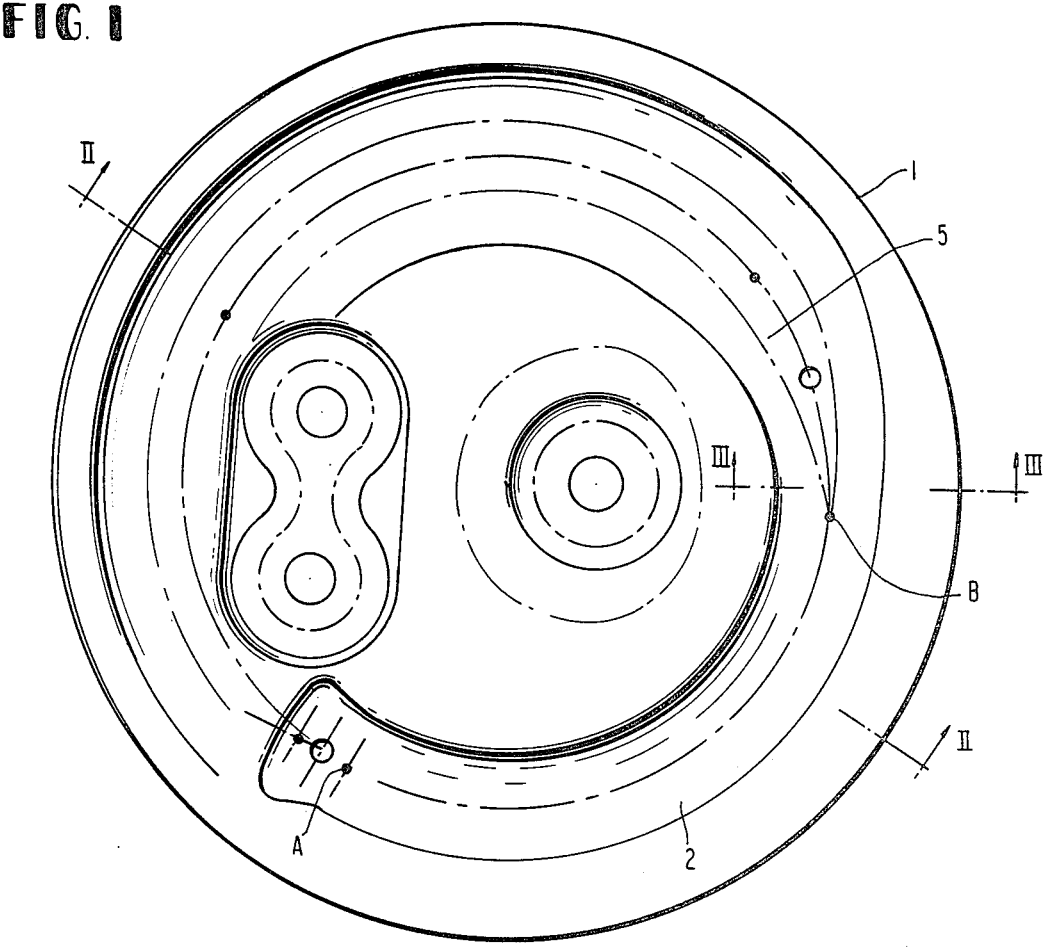
FIG. 1 is a top view of a spring seat for a coil spring constructed in accordance with the present invention.
Figure 2:
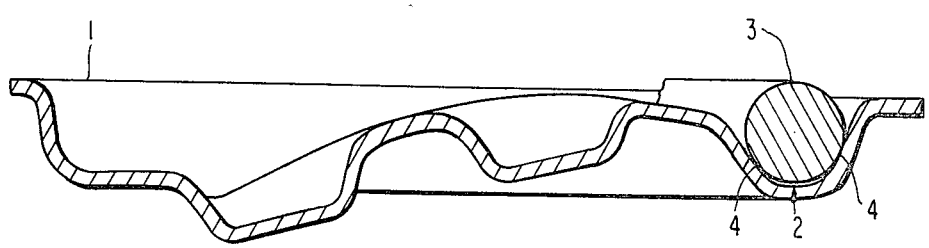
FIG. 2 is a cross sectional view of the spring seat taken along the line II—II in FIG. 1 with a spring wire supported therein.

Referring now to the drawings wherein like reference numerals are used throughout the several views to designate like parts and, more particularly, to FIGS. 1 and 2, according to these figures, a spring seat 1 includes a supporting groove 2 for enabling a fixing of a coil spring having a partially rolling terminal winding.

From a point A the supporting groove extends over a circumferential angular range of about 75°–120° and, in the illustrated embodiment, extends over an angular range of about 90°.

Figure 3:
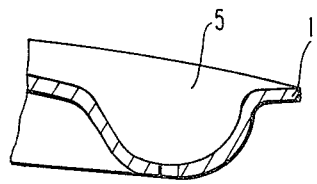
FIG. 3 is a cross sectional view of a supporting groove of the spring plate of the present invention taken along the line III—III in FIG. 1.

As shown most clearly in FIG. 2, the circumferential groove is of a substantially V-shaped cross section and is constructed in such a manner that a spring wire 3 of the coil spring contacts only flanks 4 of the V-shaped supporting groove 2. A portion of the spring wire lying in the supporting groove 2 does not participate in the rolling process when the coil spring is under a load but rather such action is performed by a subsequent portion of the spring wire. So that this subsequent portion of the spring wire is no longer centered but merely allowed to roll along, as shown in FIG. 3, a substantially U-shaped channel 5 is arranged in an area following the supporting groove 2, with the U-shaped channel 5 starting at the point B in a continuous transistion from the supporting groove 2 to the channel 5.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A spring seat for accommodating a freely terminating end portion of a spring wire of a coil spring of an axle suspension arrangement of a motor vehicle, the spring seat including a supporting groove, characterized in that the supporting groove only extends over a circumferential range of about 75°–120°, and in that the supporting groove has an approximately V-shaped cross section with side flanks of the supporting groove being disposed such that the terminating end portion of the spring wire only contacts the side flanks of the V-shaped supporting groove whereby the terminating end portion of the spring wire is prevented from participating in a rolling motion when the coil spring is under a load.

2. A spring seat according to claim 1, characterized in that the spring seat further includes a channel following the supporting groove for accommodating a subsequent portion of the spring wire, and in that the channel is dimensioned such that, under the load, the spring wire of the coil spring merely rests therein and participates in the rolling motion.

3. A spring seat according to claim 2, characterized in that the channel has a substantially U-shaped cross sectional configuration.

4. A spring seat according to claim 2, characterized in that a zone is provided between the supporting groove and the channel which is dimensioned such that, under a load, the spring wire is not in contact with the spring seat.

5. A spring seat according to one of claims 1, 2, 3, or 4, characterized in that the supporting groove extends over a circumferential angular range of about 90°.

* * * * *